(12) United States Patent
Hanaoka et al.

(10) Patent No.: US 6,621,634 B2
(45) Date of Patent: Sep. 16, 2003

(54) ANTIREFLECTION FILTER FOR DISPLAY DEVICE

(75) Inventors: Hideaki Hanaoka, Kanagawa (JP); Hirofumi Kondo, Miyagi (JP)

(73) Assignee: Sony Corporation, Tokyo (JP)

( * ) Notice: Subject to any disclaimer, the term of this patent is extended or adjusted under 35 U.S.C. 154(b) by 15 days.

(21) Appl. No.: 09/825,692

(22) Filed: Apr. 4, 2001

(65) Prior Publication Data

US 2002/0024737 A1 Feb. 28, 2002

(30) Foreign Application Priority Data

Apr. 4, 2000 (JP) .................................. P2000-102413

(51) Int. Cl.$^7$ .............................. G02B 1/10; B32B 17/06; F21V 9/00
(52) U.S. Cl. ...................... 359/582; 359/580; 428/428; 252/582; 523/122
(58) Field of Search .................................. 359/580, 586, 359/582, 360; 523/122; 524/263; 428/40.7, 216, 428, 21.2; 252/582

(56) References Cited

U.S. PATENT DOCUMENTS 5,922,787 A * 7/1999 Kondo et al. ............... 523/122
6,284,382 B1 * 9/2001 Ishikawa et al. ............ 428/428

* cited by examiner

Primary Examiner—Audrey Chang
(74) Attorney, Agent, or Firm—Sonnenschein, Nath & Rosenthal

(57) ABSTRACT

A display device antireflection filter 100 formed on a glass base material is comprised of an antireflection layer 102 of at least one layer containing $SiO_2$ and a material layer 103 made of composition produced by adding compound whose interaction with $SiO_2$ is small to compound having alkoxysilane group at terminal and which has perfluoropolyether group. This device exhibits improved wear and abrasion resistance.

9 Claims, 1 Drawing Sheet

ANTIREFLECTION FILTER FOR DISPLAY DEVICE

RELATED APPLICATION DATA

The present application claims priority to Japanese Application No. P2000-102413 filed Apr. 4, 2000, which application is incorporated herein by reference to the extent permitted by law.

BACKGROUND OF THE INVENTION

1. Field of the Invention

The present invention relates to an antireflection filter for a display device.

2. Description of the Related Art

When a viewer watches something through a transparent material such as glass, reflected light on the glass surface is strong so that, if a reflected image is clear, then a viewer will be troubled.

For example, a reflected image such as so-called ghost and flare is produced on lenses for glasses and a viewer will be troubled.

Furthermore, it is frequently observed that a user cannot clearly see contents through a looking-glass or the like due to light reflected on the glass surface.

When a problem that a sense of sight is troubled by reflected light is solved, in order to prevent reflection, heretofore, there has been proposed a method in which an antireflection layer is formed by coating a material having a different refractive index on a base material by vacuum deposition or the like.

In this method, there is known that an antireflection effect can be increased by properly setting a thickness of an antireflection layer formed on the base material.

For example, when this antireflection layer is formed as a single layer structure, in order to minimize a reflectance or to maximize a transmittance, it is effective to use a material having a lower refractive index than a base material of an underlayer and to select an optical film thickness to be ¼ of wavelength of light or to be odd-numbered times of ¼.

Here, the optical film thickness is given by the product of the refractive index of the material for forming a coated film and a film thickness of the coated film.

It is proposed that an antireflection layer is formed as a multilayer structure. In this case, there are various proposals with respect to selection of a film thickness of an antireflection layer (OPTICAL TECHNOLOGY Vol. No. 8, p17 (1971)).

On the other hand, Japanese laid-open patent application No. 58-46301 and Japanese laid-open patent application No. 59-49501 have proposed methods in which a multilayer structure antireflection layer which can satisfy a condition of the above optical film thickness by using liquid composition.

In recent years, there are proposed optical products having antireflection property in which plastics material is used as a base material by effectively utilizing good points in which plastics material is light in weight, safe and is easy to handle. These optical products have been put into practice. Most of the optical products have an antireflection layer made of a material containing silicon dioxide formed on the surface.

SUMMARY OF THE INVENTION

However, when the antireflection layer is deposited on the above base material by vacuum deposition, as the material of this antireflection layer, there are mainly used inorganic oxide or inorganic halogenide.

When glass is used as the base material, there arises a problem that, although the antireflection layer of the upper layer has high surface hardness, when it is smudged by user's finger marks, finger prints, sweat, liquid hair tonic, hair spray or the like, smudges are conspicuous and these smudges are difficult to be removed.

Since such antireflection layer is poor in surface smoothness, it is easy to be scratched conspicuously. Further, since such antireflection layer has large wetting against water, when it is smudged by raindrops or splashes of other water, large marks are easily left on the surface of the antireflection layer. In particular, there arises a problem that, when a user watches an object through glasses, the object is distorted over a large area.

In the antireflection layers described in the above Japanese laid-open patent application No. 58-46301, the above Japanese laid-open patent application No. 59-49501 and Japanese laid-open patent application No. 59-50401, there are described technologies in which the uppermost layer contains more than 30 [parts by weight] of inorganic material represented by silica fine-grained particles provide a high surface hardness. The antireflection layer obtained by the above composition encounters with a problem that it becomes poor in surface smoothness, it is easy to be scratched by friction of clothes or the like and its scratches become conspicuous.

In order to improve the above problems, there are proposed and appear on the market various surface finishing agents.

However, since any these surface finishing agents are dissolved by water and various solvents, even when the surface of the antireflection layer is treated by the surface finishing agent, the surface finishing effect is not lasting and is therefore poor in durability.

Japanese laid-open patent application No. 3-266801 has proposed a technology in which a fluororesin layer is formed to provide water repellent property. However, although the water repellent property can be provided by using the fluororesin, satisfactory results of durability with respect to friction and abrasion on the surface could not be obtained yet.

In order to improve durability with respect to friction and abrasion on the surface and to solve a problem of pollution resistance, there is proposed a technology in which an antireflection layer is surface-finished by perfluoropolyether compound (Japanese patent application No. 7-224063).

However, in the technology proposed by the above Japanese patent application No. 7-224063, since a chemical stability of surface finishing agent is not satisfactory, there arises a problem that antireflection effect of the surface is considerably deteriorated by a treatment with a solvent or the like Japanese laid-open patent application No. 9-61605 has proposed a technology in which a problem of wear and abrasion resistance or pollution resistance of a display device filter having antireflection property can be solved by coating the surface with alkoxysilane compound having perfluoropolyether group.

In the technology proposed in the Japanese laid-open patent application No. 9-61605, in order to enable SiO2 component in the glass of the underlayer of the antireflection layer and a material used to form the antireflection layer to interact with each other, a strong linkage with the $SiO_2$ component can be formed by causing molecular structure to contain alkoxysilane group.

However, in the antireflection layer proposed in this Japanese laid-open patent application No. 9-61605, having considered this antireflection layer from a wear and abrasion resistance standpoint, it is to be understood that this antireflection layer has rooms to be improved in characteristic.

Specifically, in the antireflection layer proposed in the Japanese laid-open patent application No. 9-61605, since the alkoxysilane compound chemically reacts with the SiO2 component, the surface of this material has no migration. Consequently, when friction contact occurs in actual practice, if this material is removed from the portion in which the friction contact occurred, then such damaged portion will not be restored by movement of materials from its periphery.

Accordingly, after earnest researches, the assignee of the present application proposes an antireflection filter for display device in which the above problems can be solved.

DETAILED DESCRIPTION OF THE PRESENTLY PREFERRED EMBODIMENTS

An antireflection filter for display device according to the present invention is an antireflection filter for display device formed on a glass base material. An antireflection filter for display device has an antireflection layer of at least one layer containing $SiO_2$ and a material layer made of composition produced by adding compound whose interaction with $SiO_2$ is small to compound having alkoxysilane group at terminal and having perfluoropolyether group and which is expressed by the following [Formula 2] formed on the antireflection layer.

$$R_fCOR_1-R_2-Si(OR3)_3 \quad \text{[Formula 2]}$$

($R_f$ represents perfluoropolyether group
R1 represents any one of O, NH, S
R2 represents alkylene chain
R3 represents alkyl group)

According to the antireflection filter for display device of the present invention, since the material layer formed of the composition produced by adding the compound whose interaction with $SiO_2$ is small to the compound having alkoxysilane group at terminal and perfluoropolyether group and which is expressed by the above [Formula 2] is formed on the antireflection layer of at least one layer containing $SiO_2$, the material layer becomes able to flow on the antireflection layer microscopically. Thus, when friction contact occurs on the surface of the material layer, if this material is removed from such portion, then the portion from which this material was removed can be restored by the movement of the material from its periphery, and hence the wear and abrasion resistance on the surface of the display device could be improved.

An antireflection filter for display device according to the present invention is an antireflection filter for display device formed on a glass base material. An antireflection filter for display device has an antireflection layer of at least one layer containing $SiO_2$ and a material layer made of composition produced by adding compound whose interaction with $SiO_2$ is small to compound having alkoxysilane group at terminal and having perfluoropolyether group and which is expressed by the following [Formula 3] on the antireflection layer.

$$R_fCOR1-R_2-Si(OR_3)_3 \quad \text{[Formula 3]}$$

($R_f$ represents perfluoropolyether group
$R_1$ represents any one of O, NH, S
$R_2$ represents alkylene chain
$R_3$ represents alkyl group)

An antireflection filter for display device according to an embodiment of the present invention will be described below. However, an antireflection filter for display device according to the present invention is not limited to an antireflection filter which will be described below.

Figure 1:
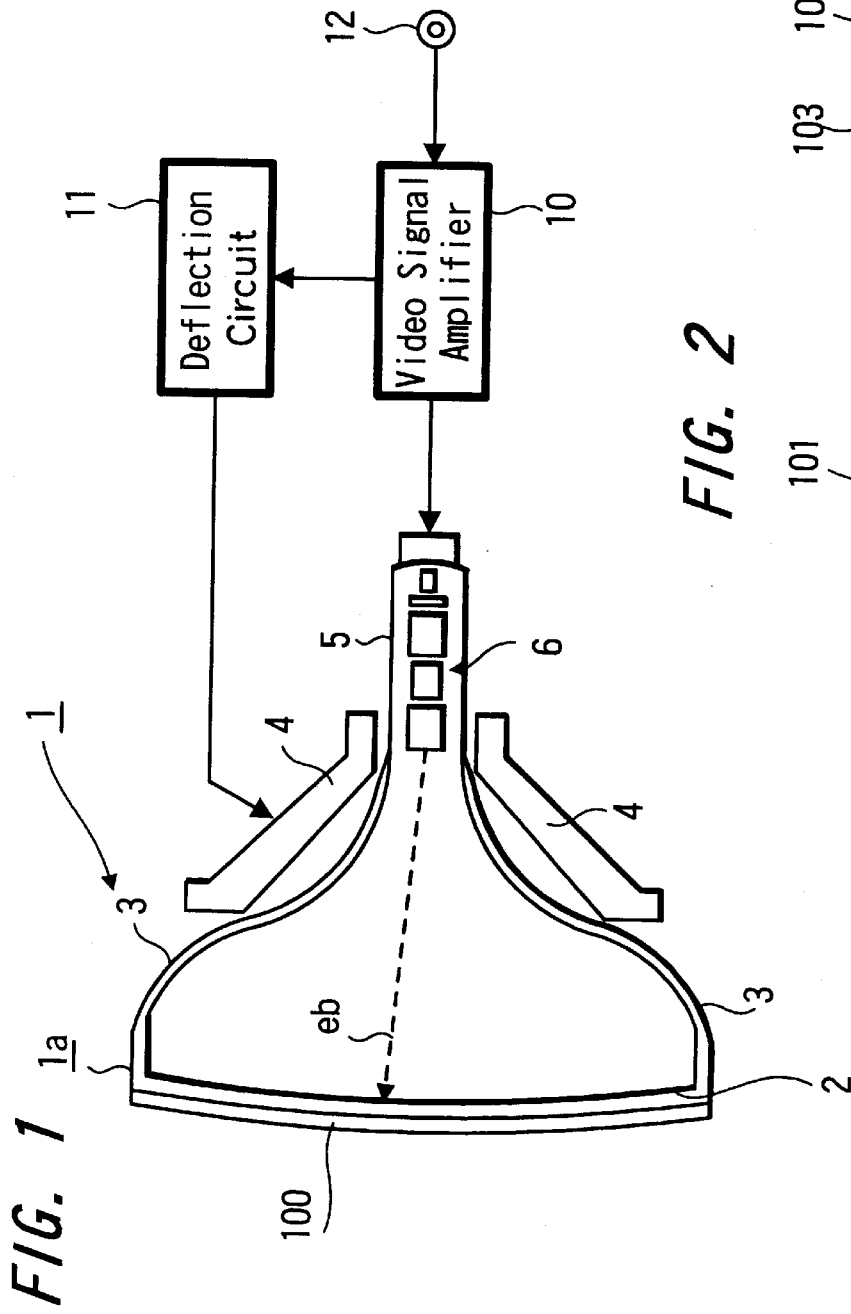
FIG. 1 is a schematic diagram showing an arrangement of an example of a display device which is applied to an antireflection filter for display device according to the present invention.

As an object of a target to which a display device antireflection filter 100 according to the present invention is applied, FIG. 1 shows a fundamental arrangement of a main portion of a display device 1 using a cathode-ray tube (hereinafter referred to as a "CRT"), e.g., monochrome CRT.

As shown in FIG. 1, a CRT 1a includes a panel portion 2 whose inside is evacuated and in which a fluorescent material is coated on the inner surface, a funnel portion 3 in which an electron beam traveling space is held at an equal potential by a conductive film coated on the inner surface and which forms a smoothing capacitor of a high withstand voltage with a conductive film formed on the outer surface and a neck portion 5 in which an electron gun 6 is disposed.

A video signal VD supplied to a terminal 12 is amplified by a video amplifier 10 and supplied to the electron gun 6. An electron beam eb responsive to the video signal VD is emitted from the electron gun 6. A deflection circuit 11 drives a deflection yoke 4 in response to horizontal and vertical synchronizing signals obtained from the video signal VD by the video amplifier 10. The electron beam eb emitted from the electron gun 6 is deflected in trajectory by a magnetic field generated from the deflection yoke 4 driven by the above deflection circuit 11 and scans the fluorescent screen formed on the inner surface of the above panel portion 2 so that phosphor on this fluorescent screen is energized to emit light. The direction in which the electron beam eb scans the fluorescent screen in the case of FIG. 1 is perpendicular to the sheet of drawing.

While the display device antireflection filter 100 according to the present invention is formed on the surface of the panel portion 2 comprising the display device 1 as shown in FIG. 1, it can be directly deposited on the surface of the panel portion 2 by coating materials or it can be formed by attaching a film-like product in which materials are coated on a predetermined transparent base material such as polyethylene terephthalate film on the surface of the panel portion 2.

Next, the display device antireflection filter 100 according to the present invention will be described with reference to a schematic cross-sectional view.

Figure 2:
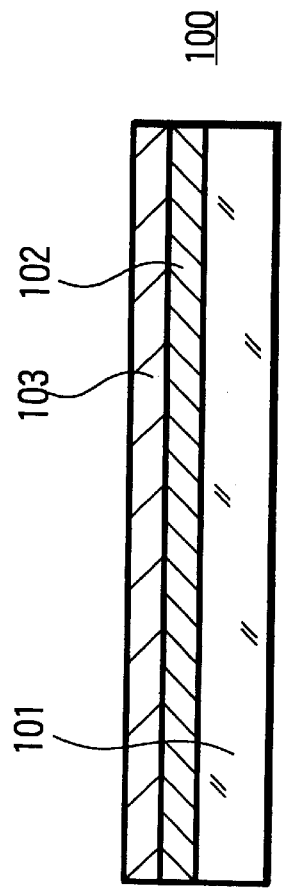
FIG. 2 is a schematic diagram showing an arrangement of an example of an antireflection filter for display device according to the present invention.

The display device antireflection filter 100 shown in FIG. 2 includes an antireflection layer 102 of at least one layer on a transparent base material 101, and a material layer 103 made of composition produced by adding compound whose interaction with predetermined SiO2 is small to the compound expressed by the above [Formula 1] is formed on this antireflection layer 102.

As the transparent base material 101 shown in FIG. 2, there can be applied polyethylene terephthalate (PET) film of 188 [$\mu$m], for example.

The antireflection layer 102 on the transparent base material 101 includes a film made of at least one layer of SiO2.

When this antireflection layer 102 has a multilayer structure, the uppermost layer includes an $SiO_2$ film.

At that time, the $SiO_2$ film of the uppermost layer can demonstrate an antireflection effect at maximum because a minimum reflectance, i.e., maximum transmittance can be realized by selecting this optical film thickness n to be $n=(\frac{1}{4})\lambda$ or odd-numbered times where $\lambda$ represents a wavelength of target light.

With respect to a film formed under the $SiO_2$ film of the uppermost layer comprising the antireflection layer 102, there can be applied respective kinds of inorganic materials in addition to $SiO_2$.

Specifically, inorganic materials such as $Al_2O_3$, $ZrO_2$, $TiO_2$, $Ta_2O_5$, SiO, $HfO_2$, ZnO, $In_2O_3/SnO_2$, TiO, $Ti_2O_3$, $Y_2O_3$, $Sb_2O_3$, MgO, $CeO_2$ can be used properly.

By forming the layer of respective kinds of inorganic materials on the underlayer of the uppermost layer comprising the antireflection layer 102 as described above, there can be improved thermal resistance, antireflection property, reflected light color, durability, surface hardness, and the like.

With respect to the selection of film thickness and refractive index of the antireflection layer having the multilayer structure, there have been made various proposals (OPTICAL TECHNOLOGY CONTACT Vol. 9, No. 9, pp 17 [1971]).

As a coating method of various kinds of inorganic materials including $SiO_2$ comprising the antireflection layer 102, there can be applied any of conventional PVD method (Physical Vapor Deposition method) such as vacuum deposition, ion plating and sputtering.

Next, the material layer 103 formed on the antireflection layer 102 will be described.

This material layer 103 is formed by composition produced by adding compound whose interaction with $SiO_2$ is small to compound having alkoxysilane group at terminal and perfluoropolyether group and which is expressed by the following [Formula 4].

$$R_fCOR_1-R_2-Si(OR_3)_3 \qquad \text{[Formula 4]}$$

($R_f$ represents perfluoropolyether group
$R_1$ represents any of O, NH, S
$R_2$ represents alkylene chain
$R_3$ represents alkyl group)

While there are enumerated those having structures expressed by the following [Formula 5] to [Formula 7] as concrete examples of the above perfluoropolyether group ($R_f$), they are not limited to the following ones.

$$F(CF_2CFCF_2O)_{\overline{n}}-\underset{|}{\phantom{x}} \qquad \text{[Formula 5]}$$
$$CF_3$$

$$CF_3(OCFCF_2)_m(OCF_2)_l-\underset{|}{\phantom{x}} \qquad \text{[Formula 6]}$$
$$CF3$$

$$F(OCF_2CF_2)_k \qquad \text{—[Formula 7]}$$

Here, l, m, n, k in the chemical structures of the above perfluoropolyether group ($R_f$) are integers of greater 1, respectively.

Moreover, as multifunctional perfluoropolyether, there is enumerated such one expressed by the following [Formula 8], by way of example.

$$-(OCF_2)_p(CF_2CF_2O)_q \qquad \text{—[Formula 8]}$$

Here, in the chemical structure of the above multifunctional perfluoropolyether, p and q are integers of greater than 1 and p/q should preferably be selected in a range of from 0.5 to 2.

"Compound whose interaction with $SiO_2$ is small" used to make composition comprising the material layer 103 is defined as compound for producing a material remaining ratio of less than 50[%] obtained when the material layer 103 was wiped away by an absorbent cotton containing ethanol about 20 times under pressure of 1 [kg/cm$^2$] and the material remaining ratios were measured after the material layer 103 had been formed finally.

As concrete examples of compounds whose interaction with $SiO_2$ is small, there are enumerated those expressed by the following [Formula 9] to [Formula 13].

$$\underset{|}{CF_3} \qquad \text{[Formula 9]}$$
$$CF_3O(CFCF_2O)CF_2OCF_3$$

$$CF_3O(CF_2O)_n(CF_2CF_2O)_mCF_2OCF_3 \qquad \text{[Formula 10]}$$

$$HOCH_2CF_2O(CF_2O)_n(CF_2CF_2O)_mCF_2OCF_2 \qquad \text{[Formula 11]}$$
$$\underset{|}{\phantom{x}}$$
$$CH2OH$$

$$C_{17}H_{35}COOCH_3 \qquad \text{[Formula 12]}$$

$$C_{18}H_{37}NH_2 \qquad \text{[Formula 13]}$$

A number-average molecular weight of compound used to form the material layer 103 comprising the display device antireflection filter 100 according to the present invention and which has alkoxysilane group at terminal and perfluoropolyether group should preferably be selected in a range of about 500 to 10000 considering chemical stability and facilitating the treatment. More preferably, the above number-average molecular weight should be selected in a range of from about 700 to 5000.

A number-average molecular weight of compound whose interaction with $SiO_2$ is small should be selected in a range of from 500 to 10000 when compound is perfluoropolyether compound, and more preferably should be selected in a range of from 500 to 5000.

The reason for this is that, if a number-average molecular weight of perfluoropolyether compound is less than 500, then when the material layer 103 is finally formed, wear and abrasion resistance effect cannot be obtained satisfactorily. If compound has a number-average molecular weight exceeding 10000, such compound is very difficult to obtain as commercially-available compounds. Furthermore, compound having a number-average molecular weight exceeding 5000 is costly when it is synthesized industrially.

From an industrial standpoint, there can be used compounds having number-average molecular weights of about 2000 to 3000 which are easy to obtain.

The display device antireflection filter 100 according to the present invention may not include the transparent material 101 and may be formed by directly depositing the antireflection layer 102 and the material layer 103 on the display screen of the cathode-ray tube 1a shown in FIG. 1.

The material layer 103 should have a thickness of approximately several [nm]. To this end, a concentration of a material coated to form the material layer 103 should be selected in a range of from 0.1 to 5 [wt %].

When in use, compositions used to form the material layer 103 are generally diluted by volatile solvent. In this case, while conventional solvents are used as solvent to dilute compositions, considering wetting, volatility for silicon dioxide of the underlayer of the material layer 103 or the like, fluorinated solvent whose surface energy is low should preferably be used.

While a film thickness of the material layer 103 should be less than 100 [nm], to secure antireflection and from a relationship between balance of rest contact angle for water and surface hardness, it should preferably be selected in a range of from about 0.5 to 10 [nm].

The material layer 103 can be formed by conventional coating. In particular, to maintain homogeneity of antireflection effect and to facilitate control of reflected interference color, there are applied spin coat, dip coating, curtain-flow coating and the like. Furthermore, there can be applied a method in which a paper, a cloth or the like is impregnated with coating liquid useful for forming the material layer 103 and the coating liquid is thereby coated and flowed.

As a glass base material for forming the display device antireflection filter 100 according to the present invention, there can be used any one of soda glass, lead glass, hard glass, quartz glass and liquid-crystal glass (e.g., Basics of Chemical Handbook, P.1–537, edited by The Japan Society of Chemistry). Further, a CRT uses silicate glass containing strontium and barium, and a liquid-crystal display device uses nonalkaline glass. Any one of these glasses can be applied to the antireflection filter for display device according to the present invention, and any of other glasses made of conventional materials also can be applied thereto.

The surface of the antireflection layer 102 which is used to form the material layer 103 comprising the display device antireflection filter 100 according to the present invention should be cleansed in advance.

When the surface of the antireflection layer 102 is cleansed, there are enumerated methods in which smudges are removed by surfactant, the surface is degreased by organic solvent and cleansed by steam based on Freon.

In order to improve adhesion with the antireflection layer 102 and the material layer 103 and in order to improve durability of the material layer 103, as a pretreatment of a coating process, the antireflection layer 102 can be treated by activated gas treatment and drug treatment based on acid and alkali, and the like.

Next, the antireflection filter for display device according to the present invention will be described with reference to concrete examples, but the antireflection filter for display device according to the present invention are not limited to the following respective examples.

First, on the display screen 2 which is the panel portion of the cathode-ray tube (CRT) shown in FIG. 1, there was formed an ITO (tin-oxide doped indium, Indium Tin Oxide) film having a thickness of about 130 [nm] by sputtering on which $SiO_2$ film having a thickness of approximately 80 [nm] was deposited as the antireflection layer 102 by vapor deposition.

Next, there were prepared compounds having alkoxysilane group at terminal and which has perfluoropolyether group. [Table 1] shows structures of [compound 1] to [compound 3] having alkoxysilane group as terminal and which have perfluoropolyether group.

TABLE 1

| | structural formula |
|---|---|
| compound 1 | $CF_3O(CFCF_2O)_1CF_2CONHC_3H_6Si(OC_2H_5)_3$ with $CF_3$ branch |
| compound 2 | $(C_2H_5O)_3SiC_3H_6NHCOCF_2O(CF_2O)_2(CF_2CF_2O)_m$ $CF_2CONHC_3H_6Si(OC_2H_5)_3$ |
| compound 3 | $C_3F_7(OCF_2CF_2CF_2)_6(OCF_2)_2[CH_2CHSi(OCH_3)_3]_{1-10}$ | where 1 is an integer from 11 to 30, n/m is 0.5 to 2 and whose number-average molecular weight is 500 to 10000 and s is an integer from 10 to 30.

Next, as compounds which are to be added to the [compound 1] to the [compound 3] on the [Table 1], there are prepared compounds whose interaction with the $SiO_2$ layer of the underlayer is small.

Structures of [compound 4] to [compound 8] whose interaction with the $SiO_2$ layer is small used in this embodiment are shown on [Table 2].

TABLE 2

| | structural formula |
|---|---|
| compound 4 | $CF_3O(CFCF_2O)_1CF_2OCF_3$ with $CF_3$ branch |
| compound 5 | $CF_3O(CF_2O)_n(CF_2CF_2)_mCF_2OCF_3$ |
| compound 6 | $HOCH_2CF_2O(CF_2O)_n(CF_2CF_2O)_mCF_2OCF_2CH_2OH$ |
| compound 7 | $C_{17}H_{35}COOCH_3$ |
| compound 8 | $C_{18}H_{37}NH_2$ | where n/m is 0.2 to 2, number-average molecular weights of the [compound 4] to the [compound 8] are 500 to 10000 and 1 is an integer from 10 to 60.

Composition 1 to composition 14 shown on the following Table 3 were made by properly combining and adding the compound 1 to the compound 3 shown on the Table 1 to the compound 4 to the compound 8 shown on the Table 2.

Ratios of respective compounds comprising these composition 1 to composition 14, i.e., ratios of compounds in the Table 1/compounds in the Table 2 are indicated on the [Table 3.

As shown on the Table 3, the ratios of composition 1 to composition 13 should be selected in a range of from 100/60 to 100/3 and the ratio of composition 14 should be selected to be outside of the above range.

TABLE 3

| composition | compound on [Table 1] | compound on [Table 2] | compound on [Table 1]/compound on [Table 2] |
|---|---|---|---|
| composition 1 | compound 1 | compound 5 | 100/25 |
| composition 2 | compound 1 | compound 6 | 100/25 |
| composition 3 | compound 1 | compound 7 | 100/25 |
| composition 4 | compound 1 | compound 8 | 100/25 |
| composition 5 | compound 2 | compound 4 | 100/25 |
| composition 6 | compound 2 | compound 5 | 100/25 |
| composition 7 | compound 3 | compound 6 | 100/25 |
| composition 8 | compound 3 | compound 7 | 100/25 |
| composition 9 | compound 1 | compound 4 | 100/3 |
| composition 10 | compound 1 | compound 4 | 100/10 |

TABLE 3-continued

| composition | compound on [Table 1] | compound on [Table 2] | compound on [Table 1]/compound on [Table 2] |
|---|---|---|---|
| composition 11 | compound 1 | compound 4 | 100/20 |
| composition 12 | compound 1 | compound 4 | 100/50 |
| composition 13 | compound 1 | compound 4 | 100/60 |
| composition 14 | compound 1 | compound 4 | 100/100 |

Next, after the composition 1 to the composition 14 had been diluted into homogeneous solution of 0.1 to 5 [weight %] by mixing 200 [parts by weight] of alcohol to 4 [parts by weight] of these compositions, solutions were filtered by a membrane filter, for example, and thereby a coating material was made.

Next, the material layer 103 was made by coating the above material on the antireflection layer 102 at a lifting rate of 5 [cm/min], for example, by dip coating.

Next, properties of the above display device antireflection filters thus made will be evaluated. Samples made by respectively using the composition 1 to the composition 13 thus made were referred to as a "[inventive example 1]" to a "[inventive example 13]".

As a target to be compared, a sample which was made without forming the material layer 103 was referred to as a "[comparative example 1]".

Further, a sample in which the material layer 103 was formed by using only the compound 1 was referred to as a "[comparative example 2]". A sample in which the material layer 103 was formed by using only the "[compound 6]" was referred to as a "[comparative example 3]". A sample in which the material layer 103 was formed by using only the "[compound 5]" was referred to as a [comparative example 4"]. A sample in which the material layer was formed by using the composition 14 on the Table 3 was referred to as a "[comparative example 5]".

Evaluation methods for evaluating characteristics of the above samples are shown on the following (1) to (5).

(1) Pollution resistance test:

Water of 5 [ml] was dropped on the surfaces of the respective samples manufactured by the above manner. After these samples had been left under ordinary temperature atmosphere for 48 hours, they were wiped away by a cloth and the states in which fur was remaining on the surfaces of the samples were observed. The state in which fur could be removed sufficiently was evaluated as "satisfactory", and the state in which fur could not be removed sufficiently was evaluated as "poor".

This pollution resistance test was evaluated before and after the surfaces of the respective samples were rinsed by ethyl alcohol solution, respectively.

(2) Surface Smoothness

The surfaces of the respective samples were scratched by a point of a commercially-available mechanical pencil with a load of 300 [g]. Evaluation standards are as follows:

Not being scratched at all: ○

Being scratched with an increase of a load: Δ

Being scratched even though a load is decreased: x

This surface smoothness was respectively evaluated before and after the surfaces of the respective samples were rinsed by ethyl alcohol solution.

(3) Wear and Abrasion Resistance Test

After the surfaces of the respective samples were rubbed by a predetermined glass wool (#0000) with a load of 300 [g] 30 times, the occurrence of scratches was evaluated. Evaluation standards are as follows:

Not being scratched at all: ○

Being scratched finely: Δ

Scratched considerably: x

This wear and abrasion resistance test was respectively evaluated before and after the surfaces of the respective samples were rinsed by ethyl alcohol solution.

(4) Evaluation of Degree of Being Difficult to be Smudged by Finger Marks:

Degrees at which the surfaces of the respective samples are difficult to be smudged by finger marks were evaluated visually. Evaluation standards are as follow:

Finger marks on the surface are inconspicuous: ○

Finger marks on the surface can be eliminated easily: Δ

Finger marks on the surface are conspicuous: x

The degrees at which the surfaces of the respective samples are difficult to be smudged by finger marks were evaluated before and after the surfaces of the respective samples were rinsed by ethyl alcohol solution, respectively.

(5) Contact Angle Test

By measuring contact angles of water ($H_2O$) and methylene iodide ($CH_2I_2$), there can be obtained standards for a remaining ratio of a lubrication film and pollution against water and oil. Specifically, it can be evaluated that the sample in which the contact angle is small is excellent in wetting and is therefore easy to be polluted. It can also be evaluated that the sample in which the contact angle is large is excellent in water repellent property and oil repellent property and is therefore difficult to be polluted.

This contact angle test was evaluated before and after the surfaces of the respective samples were rinsed by ethyl alcohol solution, respectively.

Evaluated results of the above evaluations (1) to (5) are shown on the following [Table 4].

TABLE 4

| | | pollution resistance | | surface smoothness | | wear and abrasion resistance test | | Degree of being difficult to be smudged by finger marks | | contact angle (deg.) | | | |
| | | | | | | | | | | $H_2O$ | $CH_2I_2$ | $H_2O$ | $CH_2I_2$ |
| | | | | | | | | | | before being | | after being | |
| composition | composition or compound | before | after | before | after | before | after | before | after | rinsed by ethanol | | rinsed by ethanol | |
| inventive example 1 | composition 1 | satis-factory | satis-factory | ○ | ○ | ○ | ○ | ○ | ○ | 110 | 90 | 109 | 89 |
| inventive example 2 | composition 2 | satis-factory | satis-factory | ○ | ○ | ○ | ○ | ○ | ○ | 109 | 91 | 110 | 90 |

TABLE 4-continued

| composition | composition or compound | pollution resistance before | pollution resistance after | surface smoothness before | surface smoothness after | wear and abrasion resistance test before | wear and abrasion resistance test after | Degree of being difficult to be smudged by finger marks before | Degree of being difficult to be smudged by finger marks after | contact angle (deg.) $H_2O$ before being rinsed by ethanol | contact angle (deg.) $CH_2I_2$ before being rinsed by ethanol | contact angle (deg.) $H_2O$ after being rinsed by ethanol | contact angle (deg.) $CH_2I_2$ after being rinsed by ethanol |
|---|---|---|---|---|---|---|---|---|---|---|---|---|---|
| inventive example 3 | composition 3 | satisfactory | satisfactory | ○ | ○ | ○ | ○ | ○ | ○ | 111 | 91 | 111 | 90 |
| inventive example 4 | composition 4 | satisfactory | satisfactory | ○ | ○ | ○ | ○ | ○ | ○ | 109 | 88 | 109 | 88 |
| inventive example 5 | composition 5 | satisfactory | satisfactory | ○ | ○ | ○ | ○ | ○ | ○ | 111 | 89 | 110 | 88 |
| inventive example 6 | composition 6 | satisfactory | satisfactory | ○ | ○ | ○ | ○ | ○ | ○ | 110 | 90 | 110 | 90 |
| inventive example 7 | composition 7 | satisfactory | satisfactory | ○ | ○ | ○ | ○ | ○ | ○ | 115 | 94 | 114 | 93 |
| inventive example 8 | composition 8 | satisfactory | satisfactory | ○ | ○ | ○ | ○ | ○ | ○ | 113 | 92 | 112 | 92 |
| inventive example 9 | composition 9 | satisfactory | satisfactory | ○ | ○ | ○ | ○ | ○ | ○ | 115 | 94 | 112 | 92 |
| inventive example 10 | composition 10 | satisfactory | satisfactory | ○ | ○ | ○ | ○ | ○ | ○ | 112 | 92 | 107 | 87 |
| inventive example 11 | composition 11 | satisfactory | satisfactory | ○ | ○ | ○ | ○ | ○ | ○ | 109 | 90 | 101 | 84 |
| inventive example 12 | composition 12 | satisfactory | satisfactory | ○ | ○ | ○ | ○ | ○ | ○ | 104 | 87 | 97 | 80 |
| inventive example 13 | composition 13 | satisfactory | satisfactory | ○ | ○ | ○ | ○ | ○ | ○ | 102 | 85 | 93 | 78 |
| comparative example 1 | none | poor | poor | x | x | x | x | x | x | 37 | 53 | — | — |
| comparative example 2 | compound 1 | satisfactory | satisfactory | ○ | ○ | x | x | ○ | ○ | 114 | 93 | 112 | 92 |
| comparative example 3 | compound 6 | satisfactory | poor | ○ | x | ○ | x | Δ | x | 102 | 87 | 32 | 53 |
| comparative example 4 | compound 5 | poor | poor | Δ | x | ○ | x | Δ | x | 96 | 76 | 30 | 51 |
| comparative example 5 | composition 14 | satisfactory | poor | ○ | Δ | ○ | Δ | ○ | Δ | 103 | 86 | 94 | 78 |

As shown on the Table 4, with respect to the antireflection filters for display device having the $SiO_2$ antireflection layer on the glass base material and material layers formed of the composition 1 to the composition 13, on the Table 3, produced by adding compounds on the Table 2 whose interaction with $SiO_2$ is small to compounds on the Table 1 having alkoxysilane group at terminal and which has perfluoropolyether group, there had been obtained excellent evaluated results in the above evaluations (1) to (5).

In particular, with respect to the evaluations of the wear and abrasion resistance, while any of the comparative example 1 to the comparative example 5 has demonstrated deterioration on the evaluations obtained after being rinsed by ethyl alcohol solution, any one of the samples of the inventive example 1 to the inventive example 13 has no deterioration of the wear and abrasion resistance.

In the sample of the comparative example 1 in which the material layer 103 is not formed on the antireflection layer 102, there could not be obtained satisfactory results with respect to any of the evaluations of the pollution resistance, the surface smoothness, the wear and abrasion resistance test and the degree of being difficult to be smudged by finger marks. With respect to the contact angle of water ($H_2O$) and methylene iodide ($CH_2I_2$), it was understood that the sample of this comparative example is very small contact angle as compared with other samples and is therefore easy to be polluted by water and oil.

In the sample of the comparative example 2 in which only the compound 1 on the Table 1 was used and the compound on the Table 2 was not added, there could not be obtained a satisfactory evaluated result of the wear and abrasion resistance test.

In the sample of the comparative example 3 in which the compound 6 on the Table 2 was used and the compound on the Table 1 was not used, there could not be obtained a satisfactory result of any of the evaluations of the pollution resistance, the surface smoothness, the wear and abrasion resistance, the degree of being difficult to be smudged by finger marks and the contact angle which were measured after the surface of the sample was rinsed by ethanol solution.

In the sample of the comparative example 4 in which only the compound 5 on the Table 2 was used and the compound on the Table 1 was not used, there could not be obtained satisfactory results of the respective evaluations of the pollution resistance, the surface smoothness measured after the surface of the sample was rinsed by ethanol solution, the wear and abrasion resistance, the degree of being difficult to be smudged by finger marks and the contact angle.

As shown on the Table 3, having compared the inventive example 9 to the inventive example 13 in which the material layer 103 was formed by both of the compound 1 and the compound 4 with the comparative example 5, it was understood that, while the inventive example 9 to the inventive example 13 in which the ratio of (compound 1/compound 4) was (100/60) to (100/3) could obtain desired practical results of any of the evaluations of the pollution resistance, the surface smoothness, wear and abrasion resistance test, the degree of being difficult to be smudged by finger marks and the contact angle test, the comparative example 5 using the composition 14 in which the ratio of (compound 1/compound 4) is outside the above range could not obtain preferable results of any of the evaluations of the pollution resistance measured after the surface of the sample was rinsed by ethanol solution, the surface smoothness, the wear and abrasion resistance and the degree of being difficult to be smudged by finger marks. From the above, it will be appreciated that there should be used the composition in which 3 to 60 [parts by weight] of the above compound whose interaction with SiO₂ is small are added to 100 [parts by weight] of the compound having alkoxysilane group at terminal and which has perfluoropolyether group.

As described above, according to the antireflection filter for display device of the present invention, since the material layer formed of the composition produced by adding the compound whose interaction with SiO₂ is small to the compound having alkoxysilane group at terminal and perfluoropolyether group and which is expressed by the above Formula 1 is formed on the antireflection layer of at least one layer containing SiO₂, the material layer becomes able to flow on the antireflection layer microscopically. Thus, when a friction contact occurs on the surface of the material layer in actual practice, if this material is removed from such portion, then the portion from which this material is removed can be restored by the movement of the material from its periphery, and hence the wear and abrasion resistance on the surface of the display device could be improved.

The antireflection filter for display device of the present invention can be effectively avoided from being smudged. Even when the antireflection filter for display device of the present invention is smudged, such smudges are inconspicuous and can be removed with ease.

Further, since the surface of the antireflection filter for display device of the present invention is excellent in surface smoothness, the surface is difficult to be scratched and is also excellent in durability of wear and abrasion resistance.

According to the antireflection filter for display device of the present invention, since the material layer formed of the composition produced by adding the compound whose interaction with SiO₂ is small to the compound having alkoxysilane group at terminal and perfluoropolyether group and which is expressed by the above Formula 1 is formed on the antireflection layer of at least one layer containing SiO₂, the material layer becomes able to flow on the antireflection layer microscopically. Thus, when a friction contact occurs on the surface of the material layer in actual practice, if this material is removed from such portion, then the portion from which this material is removed can be restored by the movement of the material from its periphery, and hence the wear and abrasion resistance on the surface of the display device could be improved.

The antireflection filter for display device of the present invention can be effectively avoided from being smudged. Even when the antireflection filter for display device of the present invention is smudged smudges, such smudges are inconspicuous and can be removed with ease.

Further, since the surface of the antireflection filter for display device of the present invention is excellent in surface smoothness, the surface is difficult to be scratched and is also excellent in durability of wear and abrasion resistance.

What is claimed is:

1. An antireflection filter for display device formed on a glass base material, said antireflection filter for display device comprising:

at least one antireflection layer containing $SiO_2$; and a material layer on the antireflection layer, the material layer being made of a composition produced by adding a compound having a small interaction with said $SiO_2$ to a compound having an alkoxysilane group at a terminal and a perfluoropolyether group, the compound having an alkoxysilane group at terminal and a perfluoropolyether group being expressed by the following formula:

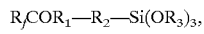

$$R_fCOR_1-R_2-Si(OR_3)_3,$$

wherein $R_f$ represents the perfluoropolyether group,
$R_1$ represents any one of O, NH, S,
$R_2$ represents an alkylene chain, and
$R_3$ represents an alkyl group, and wherein the compound whose interaction with $SiO_2$ is small is a compound that affects a ratio of an amount of the material layer remaining on the antireflection layer to an amount of the material layer removed from the antireflection layer of less than 50% when the material layer is wiped about 20 times by an absorbent cotton containing ethanol under a pressure of 1 kg/m².

2. An antireflection filter for display device according to claim 1, wherein said compound whose interaction with said $SiO_2$ is small is perfluoropolyether.

3. An antireflection filter for display device according to claim 1, wherein the glass base material is transparent.

4. An antireflection filter for display device according to claim 1, wherein 3 to 60 parts by weight of said compound whose interaction with said $SiO_2$ is small are added to 100 parts by weight of said compound expressed by said formula 1.

5. An antireflection filter for display device according to claim 1, wherein number-average molecular weight of said compound whose interaction with said $SiO_2$ is small falls in a range of from 500 to 5000.

6. An antireflection filter for display device according to claim 1, wherein said $SiO_2$ layer in at least one antireflection layer containing said $SiO_2$ has an optical film thickness of n=(¼)λ (or an optical film thickness of odd-numbered times of said n=(¼)λ (where n represents the optical film thickness and λ represents the wavelength of target light.

7. An antireflection filter for display device according to claim 1, wherein number-average molecular weight of said compound having alkoxysilane group at terminal and perfluoroether group falls in a range of 700 to 5000.

8. An antireflection filter for display device according to claim 1, wherein a coating material for forming said material layer has a concentration ranging from 0.1 to 5 (weight %).

9. An antireflection filter for display device according to claim 1, wherein s aid material layer has a film thickness ranging from 0.5 to 10 (nm).

* * * * *